(No Model.)  2 Sheets—Sheet 1.
J. E. BAGGOTT.
CREAM AND MILK TRANSPORTER.
No. 285,724.  Patented Sept. 25, 1883.
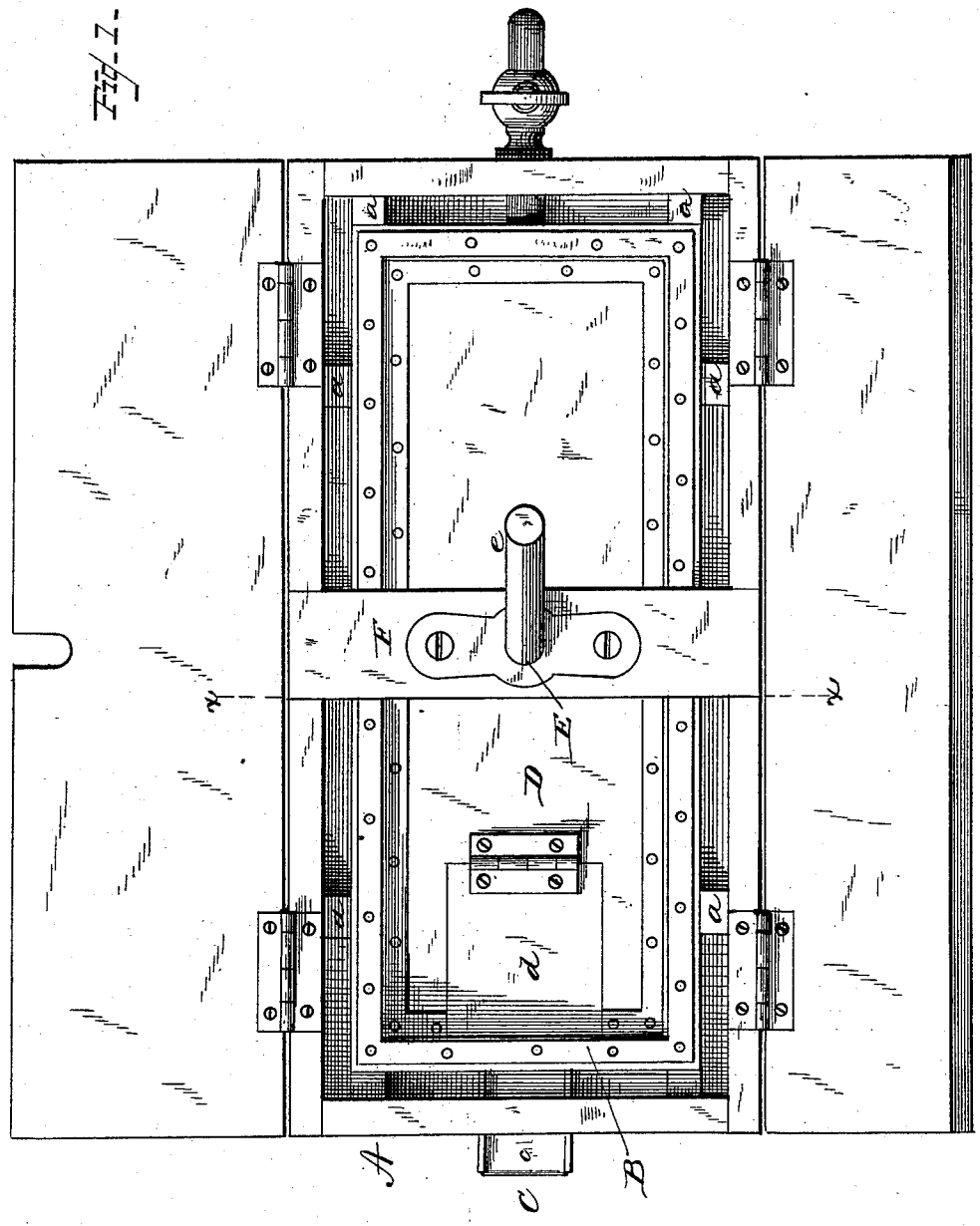
WITNESSES
F. L. Ourand
N. E. Oliphant
INVENTOR
James E. Baggott
per Chas. H. Fowler,
Attorney

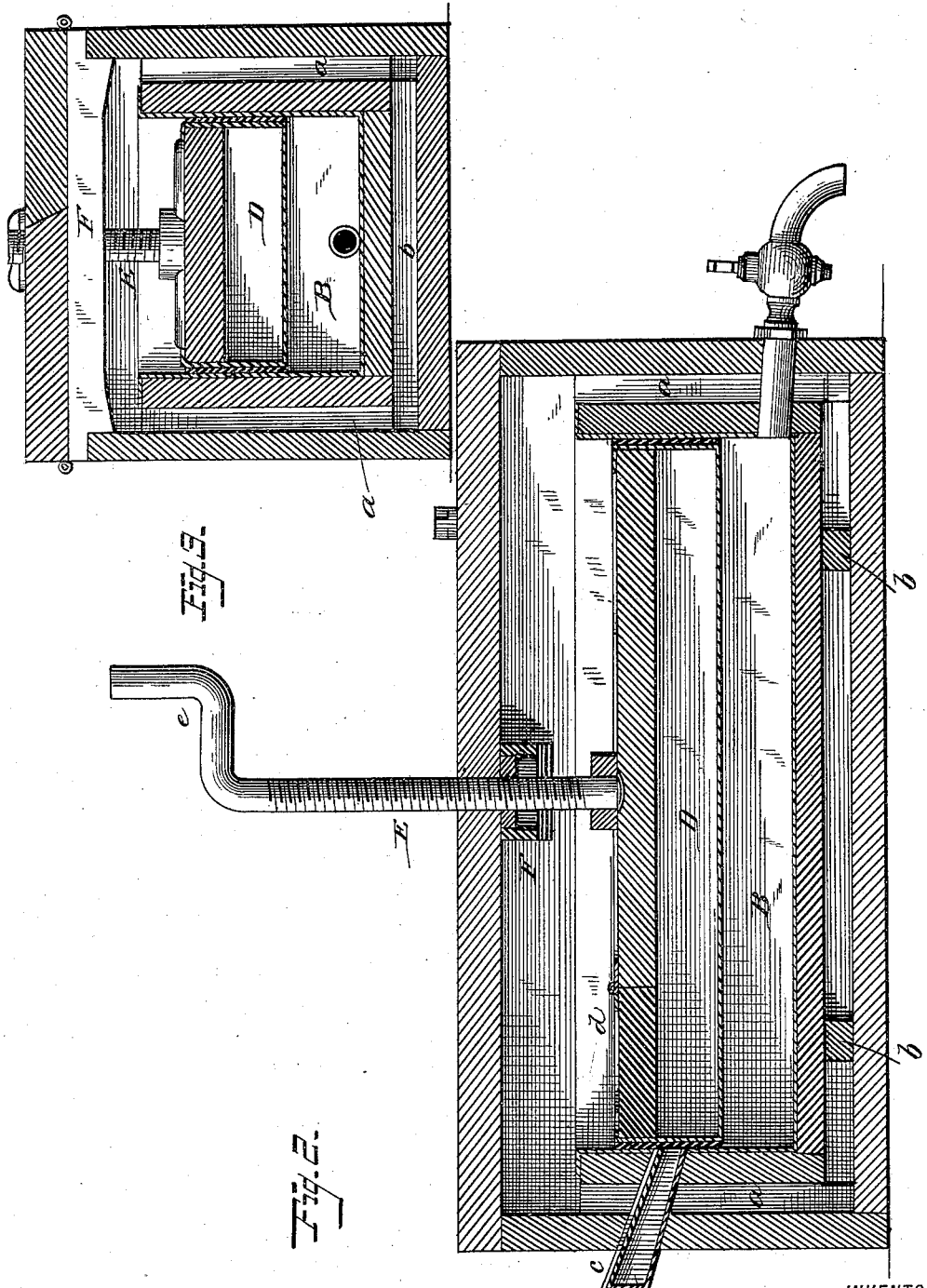

UNITED STATES PATENT OFFICE.

JAMES E. BAGGOTT, OF MEMPHIS, MISSOURI, ASSIGNOR OF ONE-HALF TO CHARLES R. COMBS, OF SAME PLACE.

CREAM AND MILK TRANSPORTER.

SPECIFICATION forming part of Letters Patent No. 285,724, dated September 25, 1883.

Application filed July 31, 1883. (No model.)

*To all whom it may concern:*

Be it known that I, JAMES E. BAGGOTT, a citizen of the United States, residing at Memphis, in the county of Scotland and State of Missouri, have invented certain new and useful Improvements in Cream and Milk Transporters; and I do hereby declare that the following is a full, clear, and exact description of the same, reference being had to the annexed drawings, making part of this specification, and to the letters and figures of reference marked thereon.

Figure 1 of the drawings is a top plan view of my invention with the cover thrown open; Fig. 2, a longitudinal vertical section; and Fig. 3, a cross-section through line $xx$, Fig. 1.

This invention relates to vessels or carriers for containing milk or cream while being transported from one place to another, and has for its object to provide such a device, simple in its construction and large in its holding capacity, by which a considerable quantity of milk or cream may be carried from place to place in one vessel or tank without danger of churning, and at the same time be prevented from freezing in winter or souring in summer, said invention consisting in the general construction and arrangement of parts, as will be hereinafter more fully described with reference to the accompanying drawings.

In the drawings, A represents an outer casing or box, having upon its interior suitable cleats, $a b$, on and between which rests a tank, B, for containing the milk or cream. The tank being smaller in its dimensions than the interior of the casing or box, an air-space is thus formed between the two, the cleats serving to support and steady the tank. Instead of having the cleats secured to the interior of the box or casing, they may be placed upon the exterior of the tank, their arrangement being a matter of convenience. The milk or cream is admitted to the tank B by means of a spout or funnel, C, extending out through one end of the outer casing or box, A, said spout or funnel being provided with a suitable cover, $c$.

Adapted to fit the interior of this tank is a box-float, D, provided with a door, $d$. Secured to this float D is a screw, E, provided with a crank-handle, $e$, said screw having its bearing in a cross-piece, F, removably fitted to the sides of the outer casing or box so as to come flush with its top, said cross-piece being held in place by the cover of this outer casing or box when closed. The milk or cream being admitted to the tank through the funnel or spout, the float is placed in position and screwed down thereon, so as to keep the same motionless and prevent churning while being transported from place to place. This float is intended to fit the tank air-tight, and to more surely accomplish this purpose suitable packing may be placed around its outer sides.

In the summer it is designed to fill the float with ice or cold water, so as to generate a current of cold air in the space between the tank and outer casing, thus keeping the milk or cream cool and preventing its souring.

In winter the float, as well as the air-space, may be filled with sawdust or other suitable material, to keep the milk or cream at an even temperature and prevent freezing.

A wagon, cart, or other vehicle may form the outer casing or box, and be provided with a tank and other described portions in proportion thereto, thus admitting of a large quantity of milk or cream being transported in bulk, said tank being provided with a faucet, by which its contents are drawn off.

Should a certain quantity of milk or cream be drawn off, it is only necessary to give the screw a few turns, and thus bring the float again tight upon the remaining contents of the tank, this operation being repeated as convenience may require.

The float and cross-piece, as well as the tank, being removably placed in the outer casing or box, admits of the several parts being readily and thoroughly cleaned.

Having now fully described my invention, what I claim as new, and desire to secure by Letters Patent, is—

1. A vessel or carrier for milk or cream, consisting of a suitable outer casing or box, a tank adapted to be placed therein and of such dimensions as to leave an air-space between the two, the hollow box-float fitting in the tank and provided with an adjusting-screw, and the cross-piece forming a bearing for this screw, substantially as and for the purpose set forth.

2. The tank, substantially as described, provided with a funnel or spout and a faucet, in combination with a suitable outer casing having interior cleats, upon and between which rests said tank, the hollow box-float, and means for adjusting the same, substantially as and for the purpose specified.

In testimony that I claim the above I have hereunto subscribed my name in the presence of two witnesses.

JAMES E. BAGGOTT.

Witnesses:
 THOS. A. REES,
 JNO. B. MUDD.